United States Patent

Wilwerding

[15] 3,679,991

[45] July 25, 1972

[54] RAPID RECYCLE OSCILLATOR WITH CUTOFF AND THERMAL PROTECTION

[72] Inventor: Dennis J. Wilwerding, Littleton, Colo.

[73] Assignee: Honeywell Inc., Minneapolis, Minn.

[22] Filed: April 15, 1971

[21] Appl. No.: 134,219

[52] U.S. Cl. ................................331/62, 315/241 R, 320/1, 331/112, 331/174

[51] Int. Cl. ..................................H02h 7/20, H05b 41/40

[58] Field of Search ........................331/62, 112, 174; 320/1; 315/241 R, 241 P

[56] References Cited

UNITED STATES PATENTS

| | | | |
|---|---|---|---|
| 2,946,924 | 7/1960 | Gerlach et al. | 315/241 R |
| 3,310,723 | 3/1967 | Schmidt et al. | 320/1 |
| 3,316,445 | 4/1967 | Ahrons | 315/241 R X |
| 3,331,033 | 7/1967 | Johnston | 331/62 X |

*Primary Examiner*—Roy Lake
*Assistant Examiner*—Siegfried H. Grimm
*Attorney*—Arthur H. Swanson and Lockwood D. Burton

[57] ABSTRACT

An oscillator provides an oscillation signal which is rectified and applied to a selectively dischargable capacitor. A control circuit monitors the charge on the capacitor and controls the cyclic operation of the oscillator to maintain the charge on the capacitor within predetermined limits, giving a visual signal indicative thereof. Temperature compensation means are included to terminate the operation of the oscillator while the temperature of the oscillator exceeds a predetermined value.

5 Claims, 1 Drawing Figure

PATENTED JUL 25 1972
3,679,991
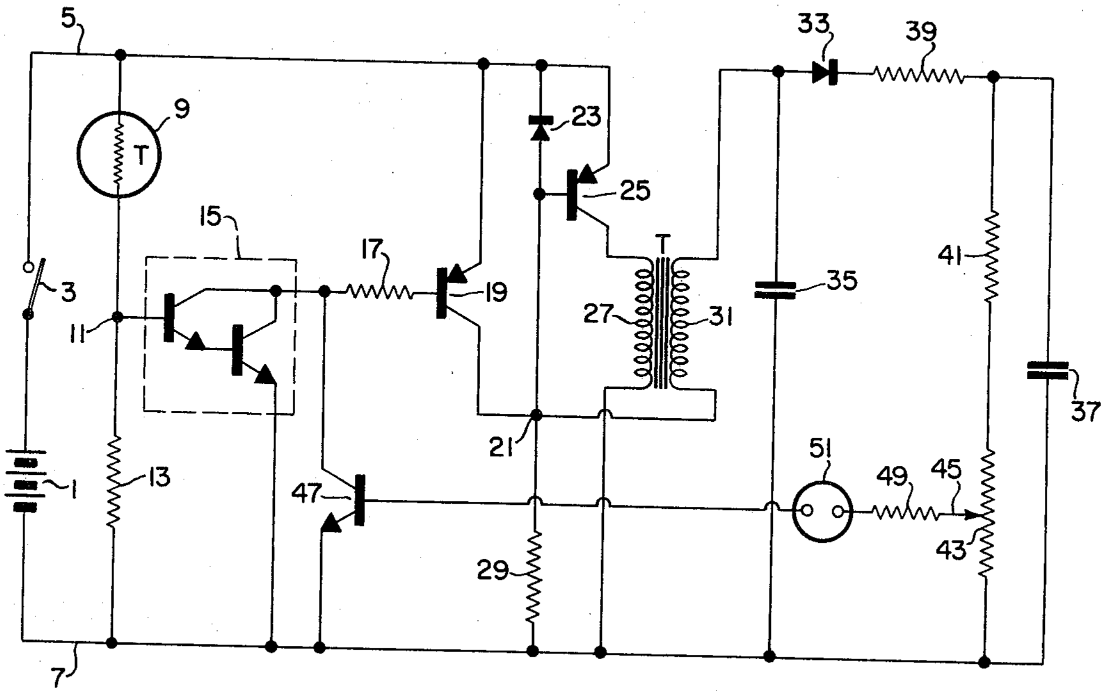
INVENTOR.
DENNIS J. WILWERDING
BY Lockwood D. Burton
ATTORNEY.

RAPID RECYCLE OSCILLATOR WITH CUTOFF AND THERMAL PROTECTION

The present invention relates generally to voltage regulation circuits and more particularly to an improved capacitor charging oscillator circuit having rapid recycle, cut-off and thermal protection characteristics.

Oscillator circuits have heretofore been provided which are operative to charge a capacitor to a first predetermined level and, upon accomplishing that end, to automatically stop oscillating. Subsequently, when the charge on the capacitor has been drained, either through leakage or intentional discharge, to a second relatively lower predetermined level, the oscillator circuit automatically restarts and recharges the capacitor to the first level. Some of those circuits have been undesirably complicated. Therefore, there is a need for an improved automatic capacitor charging oscillator circuit which is simple in design.

Some prior art oscillator circuits have been used, for example, in camera systems to charge a storage capacitor for subsequent discharge through a flashtube whereby to furnish light for a scene being photographed. In that application, for rapidly sequenced picture taking, the oscillator must be capable of rapidly recharging the capacitor. Therefore, the recycle time, i.e., the time between the time when a capacitor is discharged through a flashtube and the time that the capacitor is recharged sufficiently to effect another firing of the flashtube, must be held to a minimum. In the past, that rapid cycle time was accomplished by using an "over powered" charging circuit capable of charging the storage capacitor to a value greater than that required to ionize the flashtube, but terminating the operation of the charging circuit when the capacitor has been charged to a value sufficient to ionize the flashtube. That method takes advantage of the initial rapid charging rate exhibited by an RC type charging circuit. Such "over powered" charging circuits, while generally satisfactory, have had a tendency to heat up more quickly and a condition known in the art as "thermal runaway" would result. Therefore there is a need for an oscillator circuit capable of rapidly charging a capacitor while providing a measure of protection against thermal runaway.

It is accordingly an object of the present invention to provide an improved oscillator circuit which fulfills the foregoing needs.

It is another object of the present invention to provide an improved oscillator circuit which is capable of automatically maintaining the charge on a capacitor within a predetermined range, and yet is simple in design.

It is a further object of the present invention to provide an improved capacitor charging oscillator circuit with a rapid recycle capability and protection against thermal runaway.

In accomplishing these and other objects there has been provided, in accordance with the present invention, an improved oscillator circuit for use in capacitor charging and monitoring. An oscillator is designed to charge a capacitor to a greater voltage than that actually required for a particular application, thereby providing rapid charging. When the charge on the capacitor reaches a first predetermined value, a neon tube conducts, thereby giving off light and providing a signal which is effective to terminate the operation of the oscillator. When, through either an intentional discharge of the capacitor or capacitor leakage, the voltage on the capacitor drops below a second relatively lower predetermined value, the neon tube is extinguished thereby providing a signal which is effective to again restore the operation of the oscillator, which, in turn, recharges the capacitor. Thus, the charge on the capacitor is ordinarily maintained within predetermined limits, and a visual signal indicative thereof is provided. A temperature responsive resistor is included in the oscillator circuit for terminating the operation of the oscillator while the temperature of the oscillator exceeds a predetermined value.

A better understanding of the present invention may be had from the following detailed description, when read in connection with the accompanying drawing, in which the single FIGURE is a schematic circuit diagram illustrating an embodiment of the present invention.

Referring in detail to the single FIGURE, a battery 1 is shown with its positive terminal connected, through a selectively operable switch 3, to a bus 5 and with its negative terminal connected to a bus 7. A temperature responsive resistor 9 connects the bus 5 with a common point 11. A resistor 13 connects the point 11 with the bus 7. A "Darlington pair" 15 has its base terminal connected to the common point 11, its emitter terminal connected to the bus 7, and its collector terminal connected through a resistor 17 to the base terminal of a transistor 19. The emitter terminal of the transistor 19 is connected to the bus 5; its collector terminal is connected to a common point 21. The common point 21 is connected to the base terminal of a transistor 25 and through the anode to cathode path of a diode 23, to the bus 5. The emitter terminal of the transistor 25 is connected to the bus 5; its collector terminal is connected, through a primary winding 27 of a transformer T, to the common bus 7. The common point 21 is also connected, through a resistor 29, to the common bus 7 and, through a secondary winding 31 of the transformer T, to the anode terminal of a diode 33. A capacitor 35 is connected between the anode terminal of the diode 33 and the common bus 7. Another capacitor 37 has one terminal connected to the common bus 7 and its other terminal connected through a resistor 39 to the cathode terminal of the diode 33. A voltage divider comprising two resistors 41 and 43 is connected across the capacitor 37. The resistor 43 has a slider 45 which is connected to the base terminal of a transistor 47 through the serial connection of a resistor 49 and a neon tube 51. The emitter terminal of the transistor 47 is connected to the common bus 7; its collector terminal is connected to the collector terminal of the Darlington pair 15.

The temperature responsive resistor 9 and Darlington pair 15 are physically positioned to be responsive to the temperature changes of the transistor 25, the main power transistor of the oscillator. Assuming the capacitor 37 is not charged and the transistor 25 is at the ambient temperature, the closure of the switch 3 initially energizes the oscillator. The value of the resistance of the temperature responsive resistor 9 will decrease as the temperature, sensed thereby, increases. At ambient temperatures, the voltage applied to the base terminal of the Darlington pair 15 is not sufficiently high to render the Darlington pair 15 conductive. Since the capacitor 37 is initially uncharged, the voltage applied across the neon tube 51 from the slider 45 is insufficient to support conduction therein. With the neon tube 51 nonconductive, there is no base current to the transistor 47, therefore the transistor 47 is nonconductive. Since both the Darlington pair 15 and the transistor 47 are not conductive, there is no base current to the transistor 19, hence, the transistor 19, is also nonconductive. When the switch 3 is closed, the voltage applied to the base terminal of the transistor 25 effects conduction therein. As the current through the transistor 25 increases, the magnetic field builds up in the primary winding 27. The increasing change in flux therein induces a voltage across the secondary winding 31 of the transformer T. The voltage is induced in the secondary winding 31 in such a direction that it tends to oppose the voltage present at the base terminal of the transistor 25. After a predetermined time, the voltage induced across the secondary winding 31 reaches a point whereby the voltage fed back to the base terminal of the transistor 25 is effective to turn off the transistor 25 and terminate the current flow through the primary winding 27 of the transformer T. When the current ceases through the primary winding 27, the magnetic field built up therein collapses, and the associated change in flux in the secondary winding 31 opposite that of the initial change, causes the voltage at the base terminal of the transistor 25 to approach the value required to again turn on the transistor 25. When the transistor 25 becomes conductive, the increasing current flowing therethrough again begins to build up a magnetic field in the primary winding 27 of the transformer T, thereby completing an oscillatory cycle.

The voltage developed across the secondary winding 31 of the transformer T is supplied to the capacitor 37 through the diode 33 and the resistor 39. The voltage appearing at the slider 45 of the voltage divider (resistors 41 and 43) is representative of the voltage appearing across the capacitor 37. When the voltage at the slider 45 reaches a predetermined value, the neon tube 51 conducts and supplies a base current to the transistor 47. The transistor 47 then becomes conductive thereby allowing a base current to flow to the transistor 19 which, in turn, becomes conductive. With the transistor 19 conducting, the voltage appearing at the common point 21, and therefore the base terminal of the transistor 25, increases to a value close to the voltage present on the bus 5. That increased voltage is effective to turn off the transistor 25, thereby blocking the operation of the oscillator circuit. The transistor 25 will remain nonconductive until, through leakage or intentional discharge of the capacitor 37, the voltage appearing across the neon tube 51 is insufficient to support conduction. The neon tube 51 thereupon becomes extinguished, thereby precluding current flow to the base terminal of the transistor 47. The transistor 47 will then turn off, which, in turn, will terminate the base current flow to the transistor 19. The transistor 19 will then become nonconductive and the initial bias voltage will again appear at the base terminal of the transistor 25. The transistor 25 will then again become conductive, thereby restoring the operation of the oscillator circuit. The operation of the oscillator, as before, will continue until the capacitor 37 is sufficiently charged and the voltage at the slider 45 again commands conduction in the neon tube 51. In that manner the charge appearing on the capacitor 37 is maintained within the desirable range defined by the two predetermined values hereinbefore mentioned. If the temperature of the transistor 25 increases through, for example, repetitive cyclic operation and high current conduction, the value of the temperature responsive resistor 9, which is thermally coupled to the transistor 25, will decrease and the voltage appearing at the base terminal of the Darlington pair 15 will increase to a point sufficient to forward bias the base-emitter junction of the Darlington pair 15, thereby rendering it conductive. The voltage appearing at the base terminal of the transistor 19 will then decrease, and the emitter-base junction thereof will become forward biased thereby effecting conduction therethrough. As hereinbefore mentioned, when the transistor 19 becomes conductive the transistor 25 becomes nonconductive and the operation of the oscillator circuit is effectively blocked. While the transistor 25 is nonconductive, it is allowed to cool. When its temperature is reduced to a proper operational value, the value of the temperature responsive resistor 9 will have increased sufficiently to reestablish the required voltage at the base terminal of the Darlington pair 15 effective to render the Darlington pair 15 nonconductive. When the Darlington pair 15 becomes nonconductive the transistor 19 will again become nonconductive which, in turn, will allow the transistor 25 to become conductive, and the operation of the oscillator circuit will be effected once again.

Thus there has been provided an improved capacitor charging oscillator circuit which, is effective to maintain the charge on a capacitor within predetermined limits and provide a visual signal indicative thereof. The improved oscillator circuit includes a temperature compensation circuit effective to preclude thermal runaway of the oscillator circuit.

The embodiments of the invention in which an exclusive property or privilege is claimed are defined as follows:

1. A circuit comprising:
   oscillator means selectively operable for providing an oscillation signal;
   storage means responsive to said oscillation signal for storing a charge which is a function of said oscillation signal; and
   temperature responsive means arranged in sensing proximity to said oscillator means, said temperature responsive means being responsive to the temperature of said oscillator means and operative for blocking the operation of said oscillator means while said temperature exceeds a predetermined value.

2. The invention as set forth in claim 1 wherein said circuit further includes control means responsive to said charge for providing a control signal for controlling said operation of said oscillator means whereby to maintain said charge between predetermined levels.

3. The invention as set forth in claim 2 wherein said control means further includes a voltage responsive switching means responsive to a first level of said charge for establishing a first condition of said control signal, said first condition of said control signal being operative to block said operation of said oscillator means, said voltage responsive switching means being responsive to a second relatively lower level of said charge for providing a second condition of said control signal, said second condition of said control signal being operative to restore said operation of said oscillator means, said switching means being further operative to provide a visual signal indicative that the value of said charge is between said first and second predetermined values.

4. The invention as set forth in claim 3 wherein said circuit includes:
   first and second input terminals;
   selectively operable switching means for applying a voltage source across said first and second input terminals;
   said oscillator means being connected across said first and second terminals and responsive to said voltage source to provide said oscillation signal; and wherein said temperature responsive means includes:
   a temperature responsive voltage divider means connected across said first and second input terminals, and operable to develop an electrical signal, the value of said electrical signal being a function of the instantaneous temperature sensed by said temperature responsive voltage divider means;
   a gating means responsive to said electrical signal to provide a cut-off signal whenever said value of said electrical signal exceeds a predetermined value; and
   means responsive to said cut-off signal for blocking the operation of said oscillator means during the continuance of said cut-off signal.

5. The invention as set forth in claim 4 wherein said voltage responsive switching means includes:
   a voltage divider connected across said storage means and operable to generate a charge signal, the value of said charge signal being a function of the instantaneous charge level on said storage means;
   a voltage responsive switching device connecting said voltage divider with said gating means, said voltage responsive switching device being responsive to a first value of said charge signal for generating said first condition of said control signal and responsive to a second value of said charge signal for generating said second condition of said control signal,
   said gating means being further and independently responsive to said first condition of said control signal for providing said cut-off signal.

* * * * *